United States Patent Office

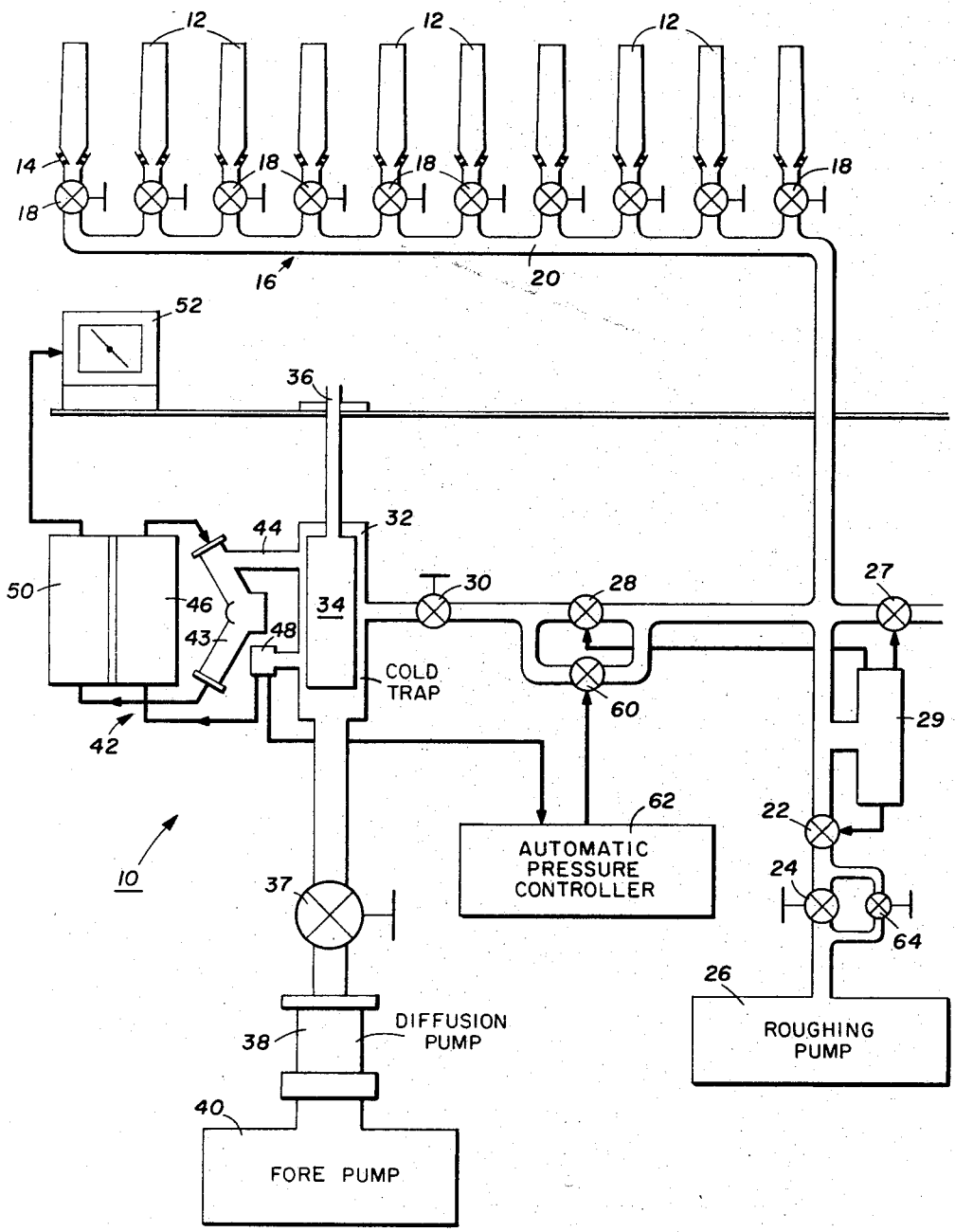

3,416,359
Patented Dec. 17, 1968

3,416,359
METHOD AND APPARATUS FOR TESTING HERMETICALLY SEALED TRANSISTOR DEVICES
Hairrel A. Durbin, Plano, and Thomas Ray Pledger, Richardson, Tex., assignors to Texas Instruments Incorporated, Dallas, Tex., a corporation of Delaware
Filed July 1, 1966, Ser. No. 562,240
8 Claims. (Cl. 73—40.7)

ABSTRACT OF THE DISCLOSURE

Disclosed is a method and apparatus for testing hermetically sealed transistor devices. The devices are subjected to helium pressure and then placed in an evacuation chamber connected to a number of vacuum pumps and a mass spectrometer. As soon as the evacuation begins, the gas in the chamber is continuously sampled during the evacuation by the mass spectrometer to test for gross leaks.

---

This invention relates generally to the fabrication of semiconductor devices, and more particularly relates to an improved method and apparatus for testing hermetically sealed semiconductor packages.

The last step in the fabrication of most semiconductor devices is the encapsulation of the device in a hermetically sealed package, typically a header and can assembly. It is imperative that this package be completely airtight in order to assure proper operation of the device over a prolonged period. Several methods for testing leaks in such hermetically sealed devices have been devised. The method most commonly used involves subjecting the sealed packages to a high pressure tracer gas, usually helium at about 100 p.s.i., for a substantial period of time, typically two hours, so that the gas will penetrate even minute leaks and pressurize the interior of the package. Then the package is placed in a vacuum chamber and the chamber evacuated. Any helium which may have entered the package through a leak will then pass out into the vacuum where it can be detected by a mass spectrometer. This method is not satisfactory for detecting packages with large or gross leaks, however. The mass spectrometer can operate only at very low pressures, and typically operates at a maximum pressure of about $10^{-5}$ millimeters of mercury. As a result, it is necessary to first evacuate the chamber down to that low pressure using a roughing vacuum pump, then open a valve to a second vacuum pump, typically a diffusion-type pump, which further reduces the pressure and in the process draws the remaining gas in the chamber through the mass spectrometer. This system works very well for containers having minute or slow leaks because the tracer gas will still be seeping from the package after the valve is opened to pass the gas through the mass spectrometer. However, if a device has a fast or gross leak, the major portion of helium will leak from the package and be evacuated from the chamber by the roughing pump as the pressure is initially lowered, and by the time the valve is opened to the mass spectrometer, the volume of helium remaining is inadequate to give a leak indication. As a result, packages with gross leaks are always passed by the mass spectrometer tester as good units.

The test most commonly used to detect packages with gross leaks involves subjecting the devices to helium at a high pressure for a sufficient period of time for the device packages to be filled with helium. Then the devices are immersed in a hot oil and any bubbles resulting from helium leaking from the packages observed by the operator. In addition to being slow, this procedure is not completely dependable. As the packages are initially immersed in the liquid, packages having extreme gross leaks commence to bubble when they hit the oil and give up all their helium content before reaching the bottom of the oil bath. This type of leak is almost never detected because the packages always trap a considerable volume of air as they enter the oil. Then as the packages are lowered to the bottom of the bath, numerous large bubbles rise to the top. These bubbles are meaningless, but are sufficient in number to camouflage the extreme gross leak for a period of time sufficient for all of the helium to leak from the package so that it goes undetected.

The principal object of this invention is to provide a method and apparatus for testing hermetically sealed semiconductor packages having any type of leak ranging from extremely minute to very gross.

Another object is to provide such a method and apparatus which requires that the hermetically sealed package be subjected to high pressure helium, and be handled only one time.

Another object is to eliminate the need for a liquid immersion test and thereby significantly decrease the cost of the devices.

These and other objects are accomplished by first subjecting each package to a high pressure tracer gas for a period of time so that the tracer gas will enter the package through any leak. Then the package is placed in a vacuum chamber and the chamber progressively evacuated. The gas within the chamber is continually sampled as the chamber is evacuated and the sampled gas passed through a mass spectrometer for detecting the tracer gas. The greater the leak, the higher the pressure at which the tracer gas will leave the package and the greater the volume of the tracer gas at that pressure. Thus, as the chamber is evacuated, the concentration of the tracer gas in the air in the vacuum chamber will always reach a sufficiently high point during the evacuation of the chamber to be detectable because when the pressure and volume of the air in the chamber is high, a large leak will nevertheless produce considerable tracer gas for a short period of time to provide a high concentration, while a smaller leak will provide a smaller supply of tracer gas until the pressure and volume of air have been reduced to a point where the tracer gas will flow at a greater volume and then constitute a concentration sufficiently high for detection. Thus, the size of the leak and the reduction of pressure are compensating factors which insure that at some point during the evacuation of the chamber the concentration of the tracer gas will be sufficiently high to be detectable and indicate a leak.

The method of this invention is carried out in an apparatus comprised of a vacuum chamber for receiving the package, a first pump connected to evacuate the chamber, a second pump connected to evacuate the chamber through a pressure regulating valve for controlling the pressure downstream of the regulator valve, and means for detecting a predetermined volume of a tracer gas in the gas stream downstream of the regulating valve.

The novel features believed characteristic of this invention are set forth in the appended claims. The invention itself, however, as well as other objects and advantages thereof, may best be understood by reference to the following detailed description of an illustrative embodiment, when read in conjunction with the accompanying drawing, wherein:

The figure is a schematic diagram which serves to illustrate the method and apparatus of the present invention.

Referring now to the drawing, a system constructed in accordance with the present invention is indicated generally by the reference numeral 10. The system 10 is comprised of a plurality of individual test chambers 12 each adapted to receive a hermetically sealed semiconductor device or other test package. Each of the chambers 12 is typically a plastic bottle having an open mouth with one or more O-ring seals around the outer periphery thereof which is adapted to be inverted in female sockets 14 of a header, indicated generally by the reference numeral 16. A series of valves 18 are provided to selectively place each of the chambers 12 in fluid communication with the manifold 20 of header 16. When one of the valves 18 is opened and a vacuum pulled in the manifold 20, the atmospheric pressure forces the mouth of the bottles 12 into the female receptacle 14 to form an airtight seal and permit evacuation of the bottles.

The manifold 20 is connected through a solenoid valve 22, and a large manually controlled solenoid valve 24 to a roughing vacuum pump 26. The manifold 20 is also connected to the atmosphere through solenoid valve 27, and to a liquid nitrogen cold trap 32 through solenoid valve 28, and manually controlled throttle valve 30. The solenoid valves 22, 27 and 28 are controlled by a vacuum controller circuit 29 which senses the pressure in the manifold 20. The controller 29 has a manual switch, not illustrated, which permits the selection of either a vent condition or a vacuum condition in the manifold 20. When the switch is in the vent position, vacuum valves 22 and 28 are closed, and vent valve 27 is open. In the vacuum position, vent valve 27 is closed, vacuum valve 22 is open and vacuum valve 28 is initially closed. After the pressure in the manifold reaches a preselected low value, vacuum valve 22 closes and vacuum valve 28 opens.

Liquid nitrogen is added to a receptacle 34 within the cold trap by means of a tube 36. The cold trap 32 is connected through a manually operated accumulator valve 37 to a diffusion pump 38 having a fore pump 40. A mass spectrometer, indicated generally by the reference numeral 42, adapted to detect helium has a detector tube 43 in fluid communication with the cold trap 32 through conduit 44. The mass spectrometer 42 is of conventional design and includes a power supply 46 which drives the detector tube 43. A discharge gauge pressure detector 48 prevents the power supply 46 from operating the tube 43 when the pressure in the cold trap exceeds a safe maximum value. The output of tube 43 goes to an amplifier 50 which drives a leak indicator 52.

The portion of the system heretofore described is essentially a model MS–9AB Helium Leak Detector manufactured and sold by Vacuum-Electronics Corp. of Terminal Drive, Plainview, Long Island, New York, presently used to detect minute leaks. In the conventional operation of the commercial tester, one or more of the chambers 12 are placed in communication with the manifold 20 by opening the respective valves 18. The vacuum controller 29 is then switched to the vacuum position so that vent valve 27 is closed and vacuum valve 22 opened. The roughing pump 26 then begins to evacuate the manifold 20 and the chamber 12. During this time, the vacuum controller 29 maintains solenoid valve 28 closed. After the pressure in the manifold 20 has been reduced sufficiently to prevent damage to the mass spectrometer tube 43, the controller 29 automatically closes valve 22 and opens valve 28 so as to place the manifold 20 is communication with the diffusion pump 38. The diffusion pump 38 maintains a low pressure within the cold trap 32, so that a portion of the gases remaining within the manifold 20 is drawn into the cold trap 32 and any helium in the gases is detected by the mass spectrometer 42. The difficulty heretofore described is that substantially all helium from a package in one of the chambers 12 having a gross leak would be exhausted by the roughing pump 26 before the valve 28 opened. Then the volume of helium entering the cold trap 32 for detection by the mass spectrometer 42 would be so low as to fail to provide a leak indication.

In accordance with the present invention, a servo operated pressure regulating valve 60 is connected in parallel with the solenoid valve 28 and is controlled by an automatic pressure controller 62. The controller 62 receives an input from the discharge gauge 48 indicative of the pressure in the cold trap downstream of valve 60 and automatically controls valve 60 so as to maintain a constant maximum pressure downstream of valve 60. This is, of course, achieved by continually bleeding gas from the manifold through valve 60 as the gas is evacuated from the cold trap by pump 38. Thus, a constant stream continually flows through valve 60 as it is evacuated by pump 38 so as to maintain the constant pressure. A manually operated valve 64 may also be connected around the valve 24 to provide a means for adjusting the rate at which the roughing pump 26 evacuates the chamber 20. The automatic pressure controller 62 and valve 60 may be a Granville-Phillips Co. Automatic Pressure Controller, catalog No. 213001.

The normal operating pressure range of the mass spectrometer tube 43 is from 0.3 micron ($3 \times 10^{-4}$ millimeters of Hg) to 0.005 micron ($5 \times 10^{-6}$ millimeters of Hg). When the test system 10 is initially turned on, the pumps 26, 38 and 40 are all set in operation. Valves 22 and 27 are operated in the alternative by manual control of control circuit 29 so that vacuum valve 22 is initially closed and vent valve 27 is initially open. As a result of the high pressure sensed in the manifold 20 by the vacuum control circuit 29, solenoid valve 28 is also closed. The pressure regulator valve 60 is continually operated by circuit 62 so as to maintain the pressure downstream of valve 60, and particularly in the cold trap 32, at about 0.05 micron. Since diffusion pump 38 has the capability to evacuate substantially below this pressure, the regulator valve 60 remains partially open and a sample of the gas in the manifold 20, which is at atmospheric pressure, is continually taken through valve 60 into the cold trap 32 and scrutinized by the mass spectrometer tube 43 through connecting port 44. The pressure sensor 48 prevents the application of power to the tube 43 at any time the pressure within the cold trap is above a safe level for operation of the tube 43.

The hermetically sealed devices which are to be tested are first subjected to high pressure tracer gas for an extended period of time, typically helium at about 100 lbs. for about two hours. The devices are then removed from the pressure vessel and one placed in each bottle 12 which are inserted in the necked connections 14. The manual control of the vacuum controller 29 is then switched to the vacuum position so that valve 27 is closed and valve 22 is open. For both gross leak and minute leak testing, valve 24 is normally closed and smaller valve 64 opened. Then the rate at which the manifold 20 is evacuated will be decreased, as compared to when valve 24 is opened and valve 64 is closed, which gives a maximum rate of evacuation desirable when testing only for minute leaks in the conventional manner. The valves 18 are opened and the pressure in the test chambers 12 and manifold 20 is progressively reduced by the roughing pump 26. As the pressure in the manifold 20 is reduced from atmospheric, a sample of the gas in the manifold is continually taken through regulator valve 60 and passed through the cold trap 32 to diffusion pump 38 and finally to fore pump 40. If the package in any one of the test chambers 12 has a gross leak, the helium will immediately be detected by the mass spectrometer 42 because the concentration of helium in the continuous sample will be high. As soon as a high level of helium is indicated by the indictor 52, the operator then closes all of the valves 18 until helium is no longer detected, and then successively opens the valves 18 to determine the chamber which contains the leaking package, which can then be removed. The test is then continued by reducing the pressure in the manifold 20 by means of roughing pump 26, down to about 50 microns, at which point the controller 29 closes valve 22 and opens valve 28. At this time, the automatic pressure controller 62 begins to close valve 60 and valve 60 is closed before valve 27 is next opened during a vent cycle. The devices having minute leaks generally do not leak sufficient helium for detection until the pressure is very low. However, at the lower pressures, the entire stream remaining in the manifold 20 is pumped through the cold trap 32 so that even a very small volume of helium can be detected. Whenever the level of helium detected indicates a leak, the leaking package is isolated by first closing the valves 18 and then successively opening them as previously described.

After the test has been completed, the manual switch is returned to the vent position which closes valve 28 and opens vent valve 27. The automatic pressure controller 62 operates valve 60 so as to again automatically maintain the desired pressure level within the chamber 32 of about 0.05 micron so that the procedure can immediately be repeated on a new set of packages.

From the above detailed description of the invention, it will be evident to those skilled in the art that a highly improved method and apparatus for testing hermetically sealed semiconductor packages and the like has been described. A complete leak test is made using one system operated on a continuous cycle, thus eliminating the need for a separate gross leak test such as submerging each unit in a hot oil bath.

Although a preferred embodiment of the invention has been described in detail, it is to be understood that various changes, substitutions and alterations can be made therein without departing from the spirit and scope of the invention as defined by the appended claims.

What is claimed is:

1. The method for testing a hermetically sealed semiconductor package or the like comprising the steps of subjecting the package to a tracer gas at high pressure, and then subjecting the package to a progressively decreasing pressure down to a low vacuum while continuously monitoring the gas around the package for excess volumes of the tracer gas indicative of a leak in the package.

2. The method for testing a hermetically sealed semiconductor package comprising subjecting the package to a tracer gas at high pressure, placing the package in a vacuum chamber, and progressively evacuating the vacuum chamber while continuously drawing the sampling stream from the vacuum chamber and monitoring the sampling stream for excess volumes of the tracer gas indicative of a leak in the package.

3. The method defined in claim 2 wherein the vacuum chamber is initially evacuated by a first pump while taking the sampling stream by the second pump.

4. The method defined in claim 3 wherein operation of the first pump is discontinued after the pressure in the vacuum chamber reaches a predetermined low value and the vacuum chamber is further evacuated by the second pump.

5. The combination defined in claim 3 wherein the pressure of the stream is maintained less than a predetermined value and the sampling stream is monitored for the tracer gas by a mass spectrometer.

6. A system for testing hermetically sealed packages which have been subjected to a tracer gas under pressure comprising:
   a vacuum chamber for receiving the package,
   a first vacuum pump connected to the vacuum chamber for progressively removing the gases from the chamber to produce a progressively lower pressure,
   a second vacuum pump,
   pressure regulator means placing the second vacuum pump in fluid communication with a vacuum chamber for maintaining a lower pressure between the pressure regulator means and the second vacuum pump than exists in the vacuum chamber,
   means and said second vacuum pump, and
   lator and said second vacuum pump to maintain a constant maximum pressure between said regulator means and said vacuum pump, and
   detector means for monitoring gas between the pressure regulator means and the second vacuum pump and detecting excess volumes of the tracer gas indicative of leak in the package.

7. The system defined in claim 6 wherein the pressure regulator means comprises an electrically operated throttling valve connecting the second vacuum pump to the vacuum chamber, means for measuring the pressure between the throttling valve and the second vacuum pump and producing an electrical signal representative of the pressure, and electrical circuit means responsive to the electrical signal for operating the throttling valve so as to maintain a constant maximum pressure between the throttling valve and the second vacuum pump.

8. The system defined in claim 6 wherein the detector means comprises a mass spectrometer having a maximum safe operating pressure and the pressure regulating means automatically maintains a pressure less than the maximum safe operating pressure.

References Cited

UNITED STATES PATENTS

| | | | |
|---|---|---|---|
| 2,486,199 | 10/1949 | Nier | 73—40.7 |
| 2,526,038 | 10/1950 | Nelson. | |
| 2,784,373 | 3/1957 | Lawrence et al. | 73—49.3 XR |
| 2,897,437 | 7/1959 | Briggs et al. | |
| 3,026,715 | 3/1962 | Briggs | 73—40.7 |
| 3,070,992 | 1/1963 | Nemeth | 73—40.7 |
| 3,174,329 | 3/1965 | Kauffman et al. | 73—40.7 |
| 3,327,521 | 6/1967 | Briggs | 73—40.7 |
| 3,342,990 | 9/1967 | Barrington et al. | 73—40.7 XR |

LOUIS R. PRINCE, *Primary Examiner.*

J. NOLTON, *Assistant Examiner.*

U.S. Cl. X.R.

73—49.3